(12) United States Patent
Kamiya et al.

(10) Patent No.: US 10,837,521 B2
(45) Date of Patent: Nov. 17, 2020

(54) ELECTRIC ACTUATOR

(71) Applicant: NIDEC TOSOK CORPORATION, Kanagawa (JP)

(72) Inventors: Akira Kamiya, Kanagawa (JP); Hiroshi Yamashita, Kanagawa (JP); Nan Wu, Kanagawa (JP)

(73) Assignee: NIDEC TOSOKK CORPORATION, Kanagawa (JP)

( * ) Notice: Subject to any disclaimer, the term of this patent is extended or adjusted under 35 U.S.C. 154(b) by 7 days.

(21) Appl. No.: 16/406,019

(22) Filed: May 8, 2019

(65) Prior Publication Data

US 2019/0346022 A1    Nov. 14, 2019

(30) Foreign Application Priority Data

May 10, 2018 (JP) ................. 2018-091713

(51) Int. Cl.
  *H02K 7/08*      (2006.01)
  *F16H 1/32*      (2006.01)
  *H02K 7/116*     (2006.01)

(52) U.S. Cl.
  CPC ............... *F16H 1/32* (2013.01); *H02K 7/083* (2013.01); *H02K 7/116* (2013.01); *F16H 2001/325* (2013.01)

(58) Field of Classification Search
  CPC .... F16H 1/32; F16H 57/021; F16H 2001/325; F16H 2057/02034; F16H 2057/0012; F16H 2057/02086; F16H 48/20; F16H 48/34; H02K 7/08; H02K 7/116; H02K 7/083; H02K 11/215; B60K 6/365; B60K 17/356; B60K 1/02; B60K 6/52; B60K 7/0007; B60W 20/00; B60W 30/1843; B60W 10/08; B60L 3/0061; B60L 50/61; B60L 50/16; B60L 15/20
  See application file for complete search history.

(56) References Cited

U.S. PATENT DOCUMENTS 10,591,031 B2 *   3/2020   Uematsu ................. H02K 7/06
2010/0219813 A1 * 9/2010   Ito ........................ B60N 2/0705
                                                           324/207.22

(Continued)

FOREIGN PATENT DOCUMENTS

JP          2016109226          6/2016

*Primary Examiner* — Naishadh N Desai
(74) *Attorney, Agent, or Firm* — JCIPRNET (57) ABSTRACT

In an electric actuator, an output shaft has a housing recess. An end of a motor shaft is housed in the housing recess. A first bearing supports the motor shaft in the housing recess. The motor shaft has an eccentric shaft. A deceleration mechanism includes an external gear connected to the eccentric shaft via a second bearing, an internal gear engaged with the external gear, a flange part expanding from the output shaft, and protrusions protruding from the flange part and disposed along the circumferential direction. The external gear has holes recessed on the other side in the axial direction. The holes are disposed along the circumferential direction and each have an inner diameter larger than the outer diameter of the protrusion. The protrusions are inserted into the holes respectively and support the external gear to be swingable around the central axis via the inner surfaces of the holes.

8 Claims, 3 Drawing Sheets

(56) References Cited

U.S. PATENT DOCUMENTS

2011/0183805 A1* 7/2011 Chan ................. B62M 25/08
                                                  475/254
2013/0324342 A1* 12/2013 Onozaki ............ B60K 6/365
                                                  475/150

* cited by examiner

ELECTRIC ACTUATOR

CROSS-REFERENCE TO RELATED APPLICATION

This application claims the priority benefit of Japan Application No. 2018-091713, filed on May 10, 2018. The entirety of the above-mentioned patent application is hereby incorporated by reference herein and made a part of this specification.

BACKGROUND

Technical Field

The disclosure relates to an electric actuator.

Description of Related Art

An electric actuator equipped with a decelerator is known. For example, Patent Document 1 describes a decelerator that has a sun gear provided on the outer circumference of an eccentric part of an input shaft via a bearing, and a ring gear engaged with the sun gear.

In the decelerator as described above, a protrusion that protrudes from the sun gear in the axial direction is inserted into a hole of an output shaft. Thereby, the rotational driving force is transmitted from the sun gear to the output shaft via the protrusion and the hole. In such a configuration, a load in the direction orthogonal to the axial direction is applied to the protrusion via the inner surface of the hole. Here, since the protrusion protrudes from the sun gear in the axial direction, the load applied to the protrusion adds a rotational moment to the sun gear in a direction that tilts in the axial direction. It may cause the sun gear to tilt. Moreover, the input shaft may tilt as the sun gear tilts. Therefore, there may be problems such as reduction in the transmission efficiency of the decelerator and generation of noise.

RELATED ART

Patent Document

[Patent Document 1] Japanese Laid-Open No. 2016-109226

SUMMARY

In view of the above, the disclosure provides an electric actuator having a structure that can suppress tilting of the external gear.

An embodiment of an electric actuator of the disclosure includes: a motor including a motor shaft that rotates around a central axis; a deceleration mechanism connected to a part of the motor shaft on one side in an axial direction; an output shaft which extends in the axial direction of the motor shaft on one side of the motor shaft in the axial direction and to which rotation of the motor shaft is transmitted via the deceleration mechanism; a first bearing connecting the motor shaft and the output shaft to be relatively rotatable with respect to each other; and a second bearing fixed to the motor shaft on the other side in the axial direction with respect to the first bearing. The output shaft has a housing recess that is recessed on one side in the axial direction. An end of the motor shaft on one side in the axial direction is housed in the housing recess. The first bearing supports the motor shaft in the housing recess. The motor shaft includes an eccentric shaft centered on an eccentric axis that is eccentric to the central axis. The deceleration mechanism includes: an external gear connected to the eccentric shaft via the second bearing; an internal gear fixed to surround an outer side of the external gear in a radial direction and engaged with the external gear; a flange part expanding from the output shaft toward the outer side in the radial direction and positioned on one side of the external gear in the axial direction; and a plurality of protrusions protruding from the flange part toward the other side in the axial direction and disposed along a circumferential direction. The external gear has a plurality of holes that are recessed on the other side in the axial direction. The holes are disposed along the circumferential direction and each have an inner diameter larger than an outer diameter of the protrusion. The protrusions are inserted into the holes respectively and support the external gear to be swingable around the central axis via inner surfaces of the holes.

According to an embodiment of the disclosure, tilting of the external gear in the electric actuator can be suppressed.

DESCRIPTION OF THE EMBODIMENTS

In the drawings, the Z axis direction is the vertical direction with the positive side as the upper side and the negative side as the lower side. The axial direction of the central axis J1 shown appropriately in the drawings is parallel to the Z axis direction, that is, the vertical direction. In the following description, unless otherwise noted, the direction parallel to the axial direction of the central axis J1 will be simply referred to as "axial direction". Also, unless otherwise noted, the radial direction centered on the central axis J1 will be simply referred to as "radial direction" and the circumferential direction centered on the central axis J1 will be simply referred to as "circumferential direction".

In the present embodiment, the upper side corresponds to the other side in the axial direction, and the lower side corresponds to one side in the axial direction. Nevertheless, the upper side and the lower side are simply names for describing the relative positional relationship between the parts, and the actual arrangement relationship may be an arrangement relationship other than the arrangement relationship etc. indicated by these names.

Figure 1:
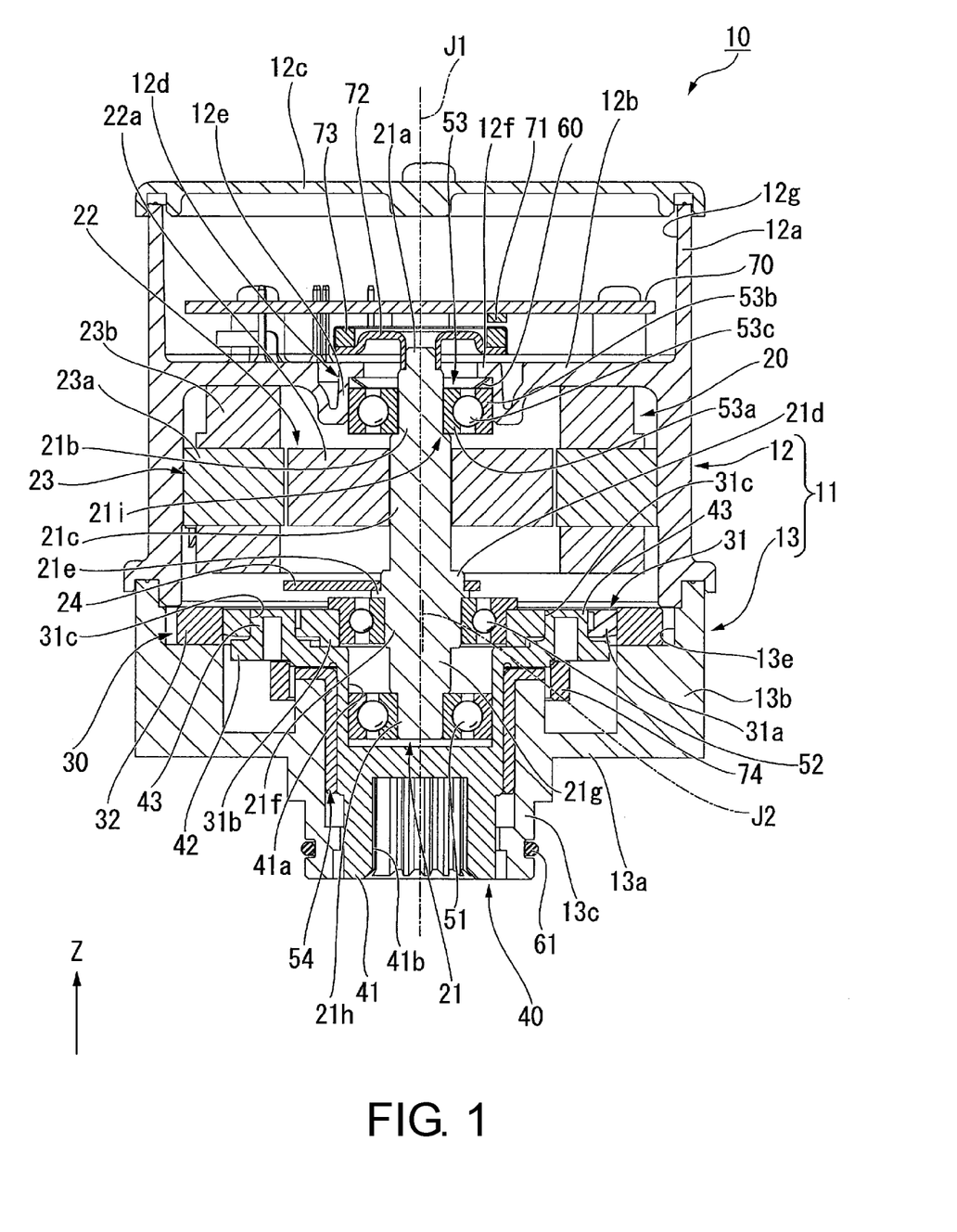
FIG. 1 is a cross-sectional view showing the electric actuator of the present embodiment.
Figure 2:
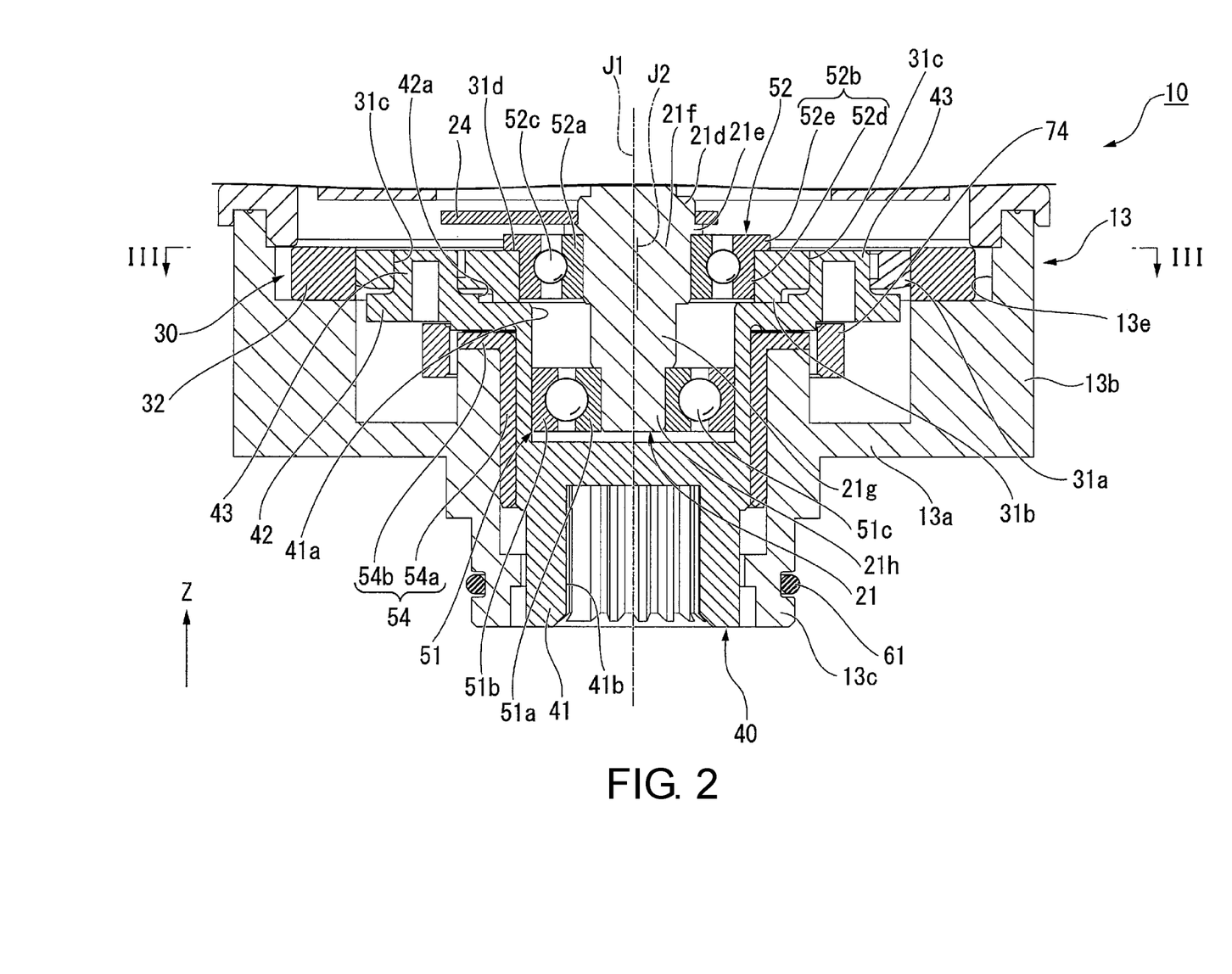
FIG. 2 is a cross-sectional view showing a part of the electric actuator of the present embodiment.
Figure 3:
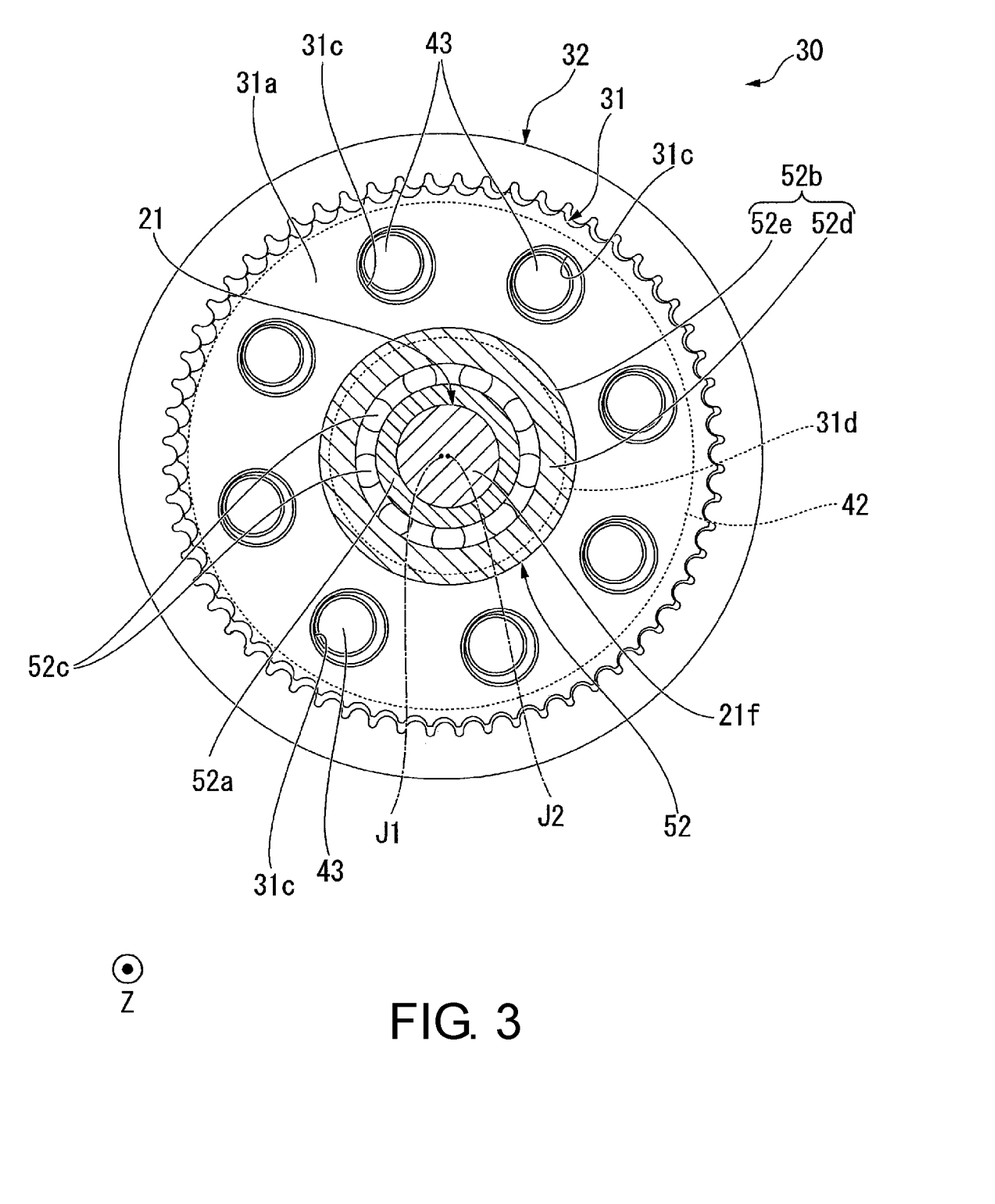
FIG. 3 is a cross-sectional view showing the electric actuator of the present embodiment, and is a cross-sectional view taken along the line III-III in FIG. 2.

An electric actuator 10 of the present embodiment shown in FIG. 1 to FIG. 3 is, for example, an electric actuator mounted on a vehicle. As shown in FIG. 1 and FIG. 2, the electric actuator 10 includes a case 11, a motor 20 having a motor shaft 21 that rotates around the central axis J1, a first bearing 51, a second bearing 52, a third bearing 53, a bush 54, a deceleration mechanism 30, an output part 40, a preload member 60, a circuit board 70, a first rotation sensor 71, an attachment member 72, a first sensor magnet 73, a second sensor magnet 74, and a second rotation sensor (not shown).

As shown in FIG. 1, the case 11 houses the motor 20 and the deceleration mechanism 30. The case 11 has a motor case 12 that houses the motor 20, and a deceleration mechanism case 13 that houses the deceleration mechanism 30. The motor case 12 has a case tube 12a, an annular plate 12b, an upper lid 12c, a bearing holding part 12d, and a circuit board housing part 12g.

The case tube 12a has a cylindrical shape that extends in the axial direction and is centered on the central axis J1. The case tube 12a opens on both sides in the axial direction. The case tube 12a surrounds the outer side of the motor 20 in the radial direction. The annular plate 12b has an annular plate shape that expands from the inner circumferential surface of the case tube 12a toward the inner side in the radial direction. The annular plate 12b covers the upper side of a stator 23 (will be described later) of the motor 20. The inner edge of the annular plate 12b in the radial direction is curved toward the lower side.

The bearing holding part 12d is provided on the inner edge of the annular plate 12b in the radial direction. The bearing holding part 12d holds the third bearing 53. The bearing holding part 12d has a holding part body 12e and a support wall 12f. The holding part body 12e has a cylindrical shape that extends from the inner edge of the annular plate 12b in the radial direction toward the upper side. The support wall 12f protrudes from the upper end of the holding part body 12e toward the inner side in the radial direction. Although not shown, the support wall 12f has an annular shape that extends along the circumferential direction.

The circuit board housing part 12g is a part that houses the circuit board 70. The circuit board housing part 12g is configured on the inner side in the radial direction in the upper part of the case tube 12a. The bottom surface of the circuit board housing part 12g is the upper surface of the annular plate 12b. The circuit board housing part 12g opens on the upper side. The upper lid 12c is a plate-shaped lid that closes the upper opening of the circuit board housing part 12g.

The deceleration mechanism case 13 is fixed to the lower side of the motor case 12. The deceleration mechanism case 13 has a lid 13a, a tube 13b, and a protruding tube 13c. The lid 13a has an annular plate shape that is centered on the central axis J1. The lid 13a covers the lower side of the deceleration mechanism 30.

The tube 13b has a cylindrical shape that protrudes from the outer edge of the lid 13a in the radial direction toward the upper side. The tube 13b opens on the upper side. The upper end of the tube 13b is in contact with and fixed to the lower end of the case tube 12a. The protruding tube 13c has a cylindrical shape that protrudes from the inner edge of the lid 13a in the radial direction toward both sides in the axial direction. The protruding tube 13c opens on both sides in the axial direction. The upper end of the protruding tube 13c is positioned below the upper end of the tube 13b. An O-ring 61 is mounted on the outer circumferential surface at the lower end of the protruding tube 13c.

As shown in FIG. 2, the bush 54 having a cylindrical shape that extends in the axial direction is disposed inside the protruding tube 13c. The bush 54 has a bush body part 54a and a bush flange part 54b. The bush body part 54a has a cylindrical shape that extends in the axial direction and is centered on the central axis J1. The bush body part 54a is fitted to the protruding tube 13c. The bush flange part 54b protrudes from the upper end of the bush body part 54a toward the outer side in the radial direction. Although not shown, the bush flange part 54b has an annular shape that is centered on the central axis J1. The bush flange part 54b is in contact with the upper end of the protruding tube 13c from the upper side. Thus, the bush 54 is prevented from falling toward the lower side from the inside of the protruding tube 13c.

As shown in FIG. 1, the motor 20 is housed in a part of the case 11 below the annular plate 12b. The motor 20 has a rotor 22 and the stator 23. The rotor 22 has a motor shaft 21 and a rotor body 22a. The motor shaft 21 is supported rotatably around the central axis J1 by the first bearing 51 and the third bearing 53. The motor shaft 21 has a first shaft 21a, a second shaft 21b, a third shaft 21c, a fourth shaft 21d, a fifth shaft 21e, a sixth shaft 21f, a seventh shaft 21g, and an eighth shaft 21h. All the shafts, except for the sixth shaft 21f, are centered on the central axis J1.

The first shaft 21a is the upper end of the motor shaft 21. The first shaft 21a protrudes above the annular plate 12b via the inner side of the bearing holding part 12d in the radial direction. The first shaft 21a is a part of the motor shaft 21, which has the smallest outer diameter. The second shaft 21b is connected to the lower side of the first shaft 21a. The outer diameter of the second shaft 21b is larger than the outer diameter of the first shaft 21a. The third shaft 21c is connected to the lower side of the second shaft 21b. The outer diameter of the third shaft 21c is larger than the outer diameter of the second shaft 21b. Thus, a stepped part 21i having an outer diameter that increases from the upper side to the lower side is provided between the second shaft 21b and the third shaft 21c. That is, the motor shaft 21 has the stepped part 21i.

The fourth shaft 21d is connected to the lower side of the third shaft 21c. The outer diameter of the fourth shaft 21d is larger than the outer diameter of the third shaft 21c. A balance weight 24 is fixed to the fourth shaft 21d. The balance weight 24 has a plate shape with the plate surface facing the axial direction. The fifth shaft 21e is connected to the lower side of the fourth shaft 21d. The outer diameter of the fifth shaft 21e is larger than the outer diameter of the fourth shaft 21d. The fifth shaft 21e is a part of the motor shaft 21, which has the largest outer diameter. The balance weight 24 is in contact with the upper end of the fifth shaft 21e. Thus, the balance weight 24 can be positioned in the axial direction with respect to the motor shaft 21.

The sixth shaft 21f is connected to the lower side of the fifth shaft 21e. The sixth shaft 21f is an eccentric shaft centered on an eccentric axis J2 that is eccentric with respect to the central axis J1. The eccentric axis J2 is parallel to the central axis J1 and is positioned on the outer side of the central axis J1 in the radial direction. The outer diameter of the sixth shaft 21f is smaller than the outer diameter of the fifth shaft 21e. That is, the fifth shaft 21e is a large-diameter shaft that is connected to the upper side of the sixth shaft 21f and has an outer diameter larger than the outer diameter of the sixth shaft 21f. The outer diameter of the sixth shaft 21f is smaller than the outer diameter of the fourth shaft 21d and larger than the outer diameter of the third shaft 21c.

The seventh shaft 21g is connected to the lower side of the sixth shaft 21f. The outer diameter of the seventh shaft 21g is smaller than the outer diameter of the sixth shaft 21f. The eighth shaft 21h is connected to the lower side of the seventh shaft 21g. The eighth shaft 21h is the lower end of the motor shaft 21. The outer diameter of the eighth shaft 21h is smaller than the outer diameter of the seventh shaft 21g. The seventh shaft 21g and the eighth shaft 21h are housed inside a housing recess 41a (will be described later).

The rotor body 22a is fixed to the outer circumferential surface of the motor shaft 21. More specifically, the rotor body 22a is fixed to the outer circumferential surface of the third shaft 21c. Although not shown, the rotor body 22a has a rotor core fixed to the outer circumferential surface of the motor shaft 21, and a rotor magnet fixed to the rotor core.

The stator 23 is positioned on the outer side of the rotor 22 in the radial direction. The stator 23 has a stator core 23a and a plurality of coils 23b. The stator core 23a has an annular shape that surrounds the outer side of the rotor 22 in the radial direction. The outer circumferential surface of the stator core 23a is fixed to the inner circumferential surface of the case tube 12a. The coils 23b are mounted on the stator core 23a via an insulator (not shown), for example.

The first bearing 51, the second bearing 52, and the third bearing 53 are rolling bearings each having an inner ring and an outer ring that is positioned on the outer side of the inner ring in the radial direction. In the present embodiment, the first bearing 51, the second bearing 52, and the third bearing 53 are ball bearings, in which the inner rings and the outer rings are connected via a plurality of balls, for example.

As shown in FIG. 2, the first bearing 51 has an inner ring 51a, an outer ring 51b, and a plurality of balls 51c. The inner ring 51a and the outer ring 51b have cylindrical shapes that are centered on the central axis J1. The first bearing 51 is fixed to a part of the motor shaft 21 below the rotor body 22a. More specifically, the first bearing 51 is fixed to the motor shaft 21 by press-fitting the inner ring 51a to the eighth shaft 21h. The first bearing 51 supports the motor shaft 21 in the housing recess 41a of the output shaft 41 (will be described later). The outer ring 51b of the first bearing 51 is fitted in the housing recess 41a. The first bearing 51 connects the motor shaft 21 and the output shaft 41 so that they are rotatable with respect to each other.

The second bearing 52 has an inner ring 52a, an outer ring 52b, and a plurality of balls 52c. The inner ring 52a and the outer ring 52b have cylindrical shapes that are centered on the eccentric axis J2. The second bearing 52 is fixed to a part of the motor shaft 21 below the rotor body 22a. More specifically, the second bearing 52 is fixed to the motor shaft 21 by press-fitting the inner ring 52a to the sixth shaft 21f. That is, the second bearing 52 is fixed to the motor shaft 21 above the first bearing 51. The fifth shaft 21e is in contact with the inner ring 52a from the upper side. The inner diameter of the second bearing 52, that is, the inner diameter of the inner ring 52a, is larger than the inner diameter of the first bearing 51, that is, the inner diameter of the inner ring 51a. The outer diameter of the second bearing 52, that is, the outer diameter of the outer ring 52b, is larger than the outer diameter of the first bearing 51, that is, the outer diameter of the outer ring 51b.

The outer ring 52b of the second bearing 52 has an outer ring body part 52d and a contact part 52e. The outer ring body part 52d is a cylindrical part fitted to the inner side of an external gear 31 (will be described later) in the radial direction. In the present embodiment, the contact part 52e protrudes from the outer ring body part 52d toward the outer side in the radial direction. More specifically, the contact part 52e protrudes from the upper end of the outer ring body part 52d toward the outer side in the radial direction. As shown in FIG. 3, the contact part 52e has an annular shape that extends along the circumferential direction. In the present embodiment, the contact part 52e has an annular shape that is centered on the eccentric axis J2. As shown in FIG. 2, the contact part 52e is in contact with the external gear 31 from the upper side. More specifically, the contact part 52e is in contact with the inner circumferential edge of the external gear 31 on the upper surface of the external gear 31.

As shown in FIG. 1, the third bearing 53 has an inner ring 53a, an outer ring 53b, and a plurality of balls 53c. The inner ring 53a and the outer ring 53b have cylindrical shapes that are centered on the central axis J1. The third bearing 53 is fixed to a part of the motor shaft 21 above the rotor body 22a. More specifically, the third bearing 53 is fixed to the motor shaft 21 by press-fitting the inner ring 53a to the second shaft 21b. Thus, the third bearing 53 rotatably supports the upper part of the motor shaft 21. The third bearing 53 is held by the bearing holding part 12d.

The inner ring 53a is in contact with a stepped surface, which faces the upper side, of the stepped part 21i from the upper side. That is, the third bearing 53 is in contact with the stepped surface, which faces the upper side, of the stepped part 21i from the upper side. Thus, the third bearing 53 can be easily and accurately positioned in the axial direction with respect to the motor shaft 21. The stepped surface, which faces the upper side, of the stepped part 21i is the upper end surface of the third shaft 21c. The outer ring 53b is fitted to the inner side of the holding part body 12e in the radial direction.

As shown in FIG. 2, the deceleration mechanism 30 is disposed on the outer side in the radial direction of the lower part of the motor shaft 21. The deceleration mechanism 30 is housed inside the deceleration mechanism case 13. The deceleration mechanism 30 is disposed between the lid 13a and the motor 20 in the axial direction. The deceleration mechanism 30 has the external gear 31, an internal gear 32, a flange part 42, and a plurality of protrusions 43.

As shown in FIG. 3, the external gear 31 has an annular shape that surrounds the sixth shaft 21f on the outer side in the radial direction of the sixth shaft 21f, which is the eccentric shaft. More specifically, the external gear 31 has a substantially annular plate shape that is centered on the eccentric axis J2 and expands on a plane orthogonal to the axial direction. A gear part is provided on the outer surface of the external gear 31 in the radial direction. As shown in FIG. 2, the external gear 31 is connected to the sixth shaft 21f via the second bearing 52. Thereby, the deceleration mechanism 30 is connected to the lower part of the motor shaft 21. The second bearing 52 connects the motor shaft 21 and the external gear 31 to be relatively rotatable around the eccentric axis J2. The external gear 31 is fitted to the outer ring body part 52d of the second bearing 52 from the outer side in the radial direction.

The external gear 31 has an external gear body part 31a and a contact protrusion 31b. The external gear body part 31a is a substantially annular plate-shaped part fixed to the outer ring 52b of the second bearing 52. The inner circumferential edge on the upper surface of the external gear body part 31a is a contacted part 31d that the contact part 52e contacts. The contact protrusion 31b is a part that protrudes from the external gear body part 31a toward the lower side. In the present embodiment, the contact protrusion 31b protrudes from the inner edge of the external gear body part 31a in the radial direction toward the lower side. Although not shown, the contact protrusion 31b has an annular shape that is centered on the eccentric axis J2. The lower surface of the contact protrusion 31b is a flat surface orthogonal to the axial direction. The lower surface of the contact protrusion 31b is, for example, a machining surface made by cutting machining.

The external gear 31 has a plurality of holes 31c recessed on the upper side. The holes 31c are provided in the external gear body part 31a. In the present embodiment, the holes 31c penetrate the external gear 31 in the axial direction. As shown in FIG. 3, the holes 31c are disposed along the circumferential direction. More specifically, the holes 31c are disposed at equal intervals over the circumference along the circumferential direction that is centered on the eccentric axis J2. The hole 31c has, for example, a circular shape as viewed along the axial direction. The inner diameter of the hole 31c is larger than the outer diameter of the protrusion 43. The number of the holes 31c is 8, for example.

The internal gear 32 is fixed to surround the outer side of the external gear 31 in the radial direction and is engaged with the external gear 31. The internal gear 32 has an annular shape that is centered on the central axis J1. As shown in FIG. 2, the outer edge of the internal gear 32 in the radial direction is disposed and fixed to a stepped part 13e that is provided on the inner circumferential surface of the tube 13b and is recessed toward the outer side in the radial direction. Thereby, the deceleration mechanism 30 is held in the deceleration mechanism case 13. As shown in FIG. 3, a gear part is provided on the inner circumferential surface of the internal gear 32. The gear part of the internal gear 32 is engaged with the gear part of the external gear 31. More specifically, the gear part of the internal gear 32 is engaged with the gear part of the external gear 31 in a part in the circumferential direction.

The flange part 42 has an annular plate shape that is centered on the central axis J1 and expands in the radial direction. As shown in FIG. 2, the flange part 42 is positioned below the external gear 31. The flange part 42 is in contact with the bush flange part 54b from the upper side. The flange part 42 expands from the output shaft 41 (will be described later) toward the outer side in the radial direction. More specifically, the flange part 42 expands from the upper end of the output shaft 41 toward the outer side in the radial direction.

The flange part 42 has a contact recess 42a recessed on the lower side. In the present embodiment, the contact recess 42a is provided on the inner edge of the flange part 42 in the radial direction. Although not shown, the contact recess 42a has an annular shape that is centered on the central axis J1. The inner circumferential edge of the contact recess 42a opens on the inne side in the radial direction. The bottom surface of the contact recess 42a is a flat surface orthogonal to the axial direction. The contact recess 42a is made, for example, by cutting machining. That is, the bottom surface of the contact recess 42a is, for example, a machining surface made by cutting machining. The lower surface of the contact protrusion 31b is in contact with the bottom surface of the contact recess 42a. The inner diameter of the contact recess 42a is larger than the outer diameter of the contact protrusion 31b. In the present embodiment, the lower end of the outer ring 52b of the second bearing 52 is inserted into the contact recess 42a. Therefore, it is easy to bring the second bearing 52 close to the flange part 42 in the axial direction, and it is easy to reduce the size of the electric actuator 10 in the axial direction.

A plurality of protrusions 43 protrude from the flange part 42 toward the upper side. That is, the protrusions 43 protrude from the flange part 42 toward the external gear 31. As shown in FIG. 2 and FIG. 3, the protrusion 43 has a hollow columnar shape. The inside of the protrusion 43 opens on the lower side. As shown in FIG. 3, the protrusions 43 are disposed along the circumferential direction. More specifically, the protrusions 43 are disposed at equal intervals over the circumference along the circumferential direction that is centered on the central axis J1. The number of protrusions 43 is 8, for example.

The protrusions 43 are respectively inserted into the holes 31c. The outer circumferential surface of the protrusion 43 is in contact with the inner circumferential surface of the hole 31c. Thus, the protrusions 43 support the external gear 31 to be swingable around the central axis J1 via the inner surfaces of the holes 31c.

In the present embodiment, the holes 31c and the protrusions 43 overlap the second bearing 52 and the sixth shaft 21f as viewed along the radial direction. In other words, the holes 31c, the protrusions 43, the second bearing 52, and the sixth shaft 21f respectively have parts that are at the same position in the axial direction.

The output part 40 is a part that outputs the driving force of the electric actuator 10. The output part 40 includes the output shaft 41, the flange part 42, and the protrusions 43. That is, the flange part 42 and the protrusions 43 which are parts of the deceleration mechanism 30 described above are also parts of the output part 40. In the present embodiment, the output part 40 is a single member.

The output shaft 41 extends in the axial direction of the motor shaft 21 on the lower side of the motor shaft 21. The output shaft 41 has a columnar shape that is centered on the central axis J1. The output shaft 41 extends from the inner edge of the flange part 42 in the radial direction toward the lower side. The output shaft 41 is fitted to the inner side of the bush 54 in the radial direction. The output shaft 41 is supported rotatably around the central axis J1 by the bush 54. The output shaft 41 is disposed through the inside of the protruding tube 13c. In the present embodiment, the lower end of the output shaft 41 is at the same position as the lower end of the protruding tube 13c in the axial direction.

The output shaft 41 has the housing recess 41a and a connecting recess 41b. The housing recess 41a is recessed from the upper end of the output shaft 41 toward the lower side. Although not shown, the housing recess 41a has a circular shape that is centered on the central axis J1 as viewed along the axial direction. The housing recess 41a houses the lower end of the motor shaft 21. In the present embodiment, the seventh shaft 21g and the eighth shaft 21h are housed in the housing recess 41a. The lower end surface of the motor shaft 21 is positioned above the bottom surface of the housing recess 41a. The lower end surface of the motor shaft 21 faces the bottom surface of the housing recess 41a via a gap in the axial direction.

The connecting recess 41b is recessed from the lower end of the output shaft 41 toward the upper side. Although not shown, the connecting recess 41b has a substantially circular shape that is centered on the central axis J1 as viewed along the axial direction. On the inner circumferential surface of the connecting recess 41b, a plurality of spline grooves are provided along the circumferential direction. Another member to which the driving force of the electric actuator 10 is outputted is inserted and connected to the connecting recess 41b. The another member is, for example, a manual shaft in a vehicle. The electric actuator 10 drives the manual shaft based on a shift operation of the driver to switch the gear of the vehicle.

When the motor shaft 21 is rotated around the central axis J1, the sixth shaft 21f, which is an eccentric shaft, revolves in the circumferential direction around the central axis J1. The revolution of the sixth shaft 21f is transmitted to the external gear 31 via the second bearing 52, and the external gear 31 swings while the position where the inner circumferential surface of the hole 31c and the outer circumferential surface of the protrusion 43 are in contact with each other changes. As a result, the position where the gear part of the external gear 31 and the gear part of the internal gear 32 are engaged with each other changes in the circumferential direction. Therefore, the rotational force of the motor shaft 21 is transmitted to the internal gear 32 via the external gear 31.

Here, in the present embodiment, the internal gear 32 is fixed and therefore does not rotate. Thus, the reaction force of the rotational force transmitted to the internal gear 32 causes the external gear 31 to rotate around the eccentric axis J2. At this time, the direction of rotation of the external gear 31 is opposite to the direction of rotation of the motor shaft 21. The rotation of the external gear 31 around the eccentric axis J2 is transmitted to the flange part 42 via the holes 31c and the protrusions 43. Thereby, the output shaft 41 rotates around the central axis J1. Thus, the rotation of the motor shaft 21 is transmitted to the output shaft 41 via the deceleration mechanism 30.

The rotation of the output shaft 41 is decelerated with respect to the rotation of the motor shaft 21 by the deceleration mechanism 30. Specifically, in the configuration of the deceleration mechanism 30 of the present embodiment, the deceleration ratio R of the rotation of the output shaft 41 to the rotation of the motor shaft 21 is represented by $R=-(N2-N1)/N2$. The negative sign at the beginning of the equation representing the deceleration ratio R indicates that the direction of rotation of the output shaft 41 to be decelerated is opposite to the direction of rotation of the motor shaft 21. N1 is the number of teeth of the external gear 31 and N2 is the number of teeth of the internal gear 32. As an example, when the number of teeth N1 of the external gear 31 is 59 and the number of teeth N2 of the internal gear 32 is 60, the deceleration ratio R is $-1/60$.

Thus, with the deceleration mechanism 30 of the present embodiment, the deceleration ratio R of the rotation of the output shaft 41 to the rotation of the motor shaft 21 can be made relatively large. Therefore, the rotational torque of the output shaft 41 can be made relatively large.

Here, when the deceleration mechanism 30 operates as described above, a load in the direction orthogonal to the axial direction is generated on the part where the outer circumferential surface of the protrusion 43 and the inner circumferential surface of the hole 31c are in contact. At this time, for example, if the position where the load is generated is apart from the external gear 31 in the axial direction, the load may generate a rotational moment on the external gear 31 in the direction tilting in the axial direction, and the external gear 31 may tilt. Therefore, there may be problems such as reduction in the transmission efficiency of the decelerator and generation of noise. In particular, in the deceleration mechanism 30 of the present embodiment as described above, the rotational torque of the output shaft 41 is relatively large and therefore the load applied to the part where the outer circumferential surface of the protrusion 43 and the inner circumferential surface of the hole 31c are in contact is relatively large. As a result, the external gear 31 may tilt further.

In contrast thereto, according to the present embodiment, the holes 31c into which the protrusions 43 are inserted are provided in the external gear 31. Therefore, the load, which is generated on the part where the outer circumferential surface of the protrusion 43 and the inner circumferential surface of the hole 31c are in contact, is likely to be generated at the same position as the external gear 31 in the axial direction. Thus, the load can be directly received by the external gear 31 in the radial direction, and generation of the rotational moment in the direction in which the external gear 31 tilts can be suppressed. Accordingly, tilting of the external gear 31 can be suppressed, and tilting of the motor shaft 21 can be suppressed. Therefore, it is possible to suppress the occurrence of problems such as reduction in the transmission efficiency of the deceleration mechanism 30 and generation of noise.

Further, in the present embodiment, the first bearing 51 which is one of the bearings for supporting the motor shaft 21 is the bearing for connecting the output shaft 41 and the motor shaft 21, and is at a position shifted from the second bearing 52 in the axial direction. Therefore, compared with the case where the first bearing 51 is fixed to the case 11, for example, the support of the motor shaft 21 tends to be unstable. As a result, in particular, the external gear 31 and the motor shaft 21 may tilt easily. Accordingly, the effect of suppressing the tilting of the external gear 31 and the motor shaft 21 as described above is particularly useful when the output shaft 41 and the motor shaft 21 are connected at the position where the first bearing 51 is shifted from the second bearing 52 in the axial direction.

In addition, according to the present embodiment, the holes 31c and the protrusions 43 overlap the second bearing 52 and the sixth shaft 21f as viewed along the radial direction. Therefore, the load generated on the holes 31c and the protrusions 43 can be directly received by the external gear 31, the second bearing 52, and the sixth shaft 21f in the radial direction. Thereby, it is possible to further suppress generation of the rotational moment in the direction in which the external gear 31 tilts. Therefore, tilting of the external gear 31 and the motor shaft 21 can be further suppressed.

As shown in FIG. 1, the preload member 60 is positioned between the outer ring 53b and the support wall 12f in the axial direction. The preload member 60 is in contact with the upper surface of the outer ring 53b and the lower surface of the support wall 12f. The preload member 60 is an elastic member and is disposed in a state of being compressed and elastically deformed in the axial direction. As a result, the preload member 60 applies a downward elastic force to the outer ring 53b. The elastic force applied to the outer ring 53b is transmitted to the motor shaft 21 via the balls 53c and the inner ring 53a. Thus, the preload member 60 applies a downward preload to the motor shaft 21 via the third bearing 53. In the present embodiment, the preload member 60 is, for example, a wave washer.

When a downward preload is applied to the motor shaft 21 by the preload member 60, a downward force is applied to the inner ring 52a of the second bearing 52 via the fifth shaft 21e. Then, as the downward force is applied to the inner ring 52a, the downward force is also applied to the outer ring 52b via the balls 52c. Therefore, the downward force can be applied to the external gear 31 by the contact part 52e. Thereby, the external gear 31 can be prevented from shifting toward the upper side with respect to the motor shaft 21.

The contact part 52e presses and brings the external gear 31 into contact with the flange part 42. As a result, the external gear 31 is held in contact with the contact part 52e and the flange part 42 in the axial direction. Therefore, it is possible to prevent the external gear 31 from shifting toward both sides in the axial direction with respect to the second bearing 52. As a result, it is possible to suppress the occurrence of problems such as reduction in the transmission efficiency of the deceleration mechanism 30 and generation of noise. Further, since the flange part 42 can be held and pressed in the axial direction by the external gear 31 and the bush flange part 54b, shifting of the output shaft 41 in the axial direction can also be suppressed.

Also, according to the present embodiment, the contact part 52e has an annular shape that extends along the circumferential direction. Therefore, the external gear 31 can be pressed from the upper side by the contact part 52e throughout the circumferential direction. Thus, it is possible to more stably suppress shifting of the external gear 31 in the axial direction.

Further, according to the present embodiment, the contact part 52e protrudes from the outer ring body part 52d toward the outer side in the radial direction to be in contact with the inner circumferential edge of the external gear 31 on the upper surface of the external gear 31. Therefore, the external gear 31 can be easily pressed from the upper side by the second bearing 52 without complicating the shape of the external gear 31.

In addition, according to the present embodiment, the external gear 31 is provided with the contact protrusion 31b, and the flange part 42 is provided with the contact recess 42a. Then, the lower surface of the contact protrusion 31b is in contact with the bottom surface of the contact recess 42a. Therefore, by machining the lower surface of the contact protrusion 31b and the bottom surface of the contact recess 42a with high surface accuracy, the external gear 31 and the flange part 42 can be brought into contact with each other accurately without tilting. Thus, the external gear 31 and the flange part 42 can be brought into contact with high accuracy by performing partial cutting machining or the like without accurately machining the entire lower surface of the external gear 31 and the entire upper surface of the flange part 42. Accordingly, the electric actuator 10 with excellent assembly accuracy can be obtained while the time and cost for manufacturing the electric actuator 10 are reduced.

Moreover, according to the present embodiment, the preload member 60 applies a downward preload to the motor shaft 21 via the third bearing 53. Then, the third bearing 53 is in contact with the stepped surface, which faces the upper side, of the stepped part 21i from the upper side. Therefore, the downward force applied to the third bearing 53 by the preload member 60 can be easily transmitted to the motor shaft 21 via the stepped surface of the stepped part 21i. As a result, the external gear 31 can be pressed more stably and shifting of the external gear 31 in the axial direction can be further suppressed.

Further, as described above, the third bearing 53 can be positioned with respect to the motor shaft 21 in the axial direction by the stepped part 21i. Therefore, variation of the position of the third bearing 53 in the axial direction can be suppressed, and variation of the distance between the third bearing 53 and the support wall 12f in the axial direction can be suppressed. Thus, in the case where the preload member 60 is an elastic member as in the present embodiment, the compressive elastic deformation amount of the preload member 60 positioned between the outer ring 53b of the third bearing 53 and the support wall 12f in the axial direction can be stabilized. Accordingly, variation of the preload that the preload member 60 applies to the motor shaft 21 can be suppressed. In other words, it is easy to apply a constant preload to the motor shaft 21 without changing the elastic modulus of the preload member 60 for each electric actuator 10 manufactured.

The circuit board 70 has a plate shape that expands on a plane orthogonal to the axial direction. The circuit board 70 is housed in the motor case 12. More specifically, the circuit board 70 is housed in the circuit board housing part 12g and is disposed on the upper side away from the annular plate 12b. The circuit board 70 is a board electrically connected to the motor 20. The coils 23b are electrically connected to the circuit board 70. The circuit board 70 controls the current supplied to the motor 20, for example. That is, an inverter circuit is mounted on the circuit board 70, for example.

The attachment member 72 has an annular shape that is centered on the central axis J1. The inner circumferential surface of the attachment member 72 is fixed to the outer circumferential surface of the upper end of the motor shaft 21, that is, the first shaft 21a. The attachment member 72 is positioned on the upper side of the bearing holding part 12d. The attachment member 72 is made of a nonmagnetic material, for example. Nevertheless, the attachment member 72 may also be made of a magnetic material.

The first sensor magnet 73 has an annular shape that is centered on the central axis J1. The first sensor magnet 73 is fixed to the upper end surface on the outer edge of the attachment member 72 in the radial direction. How the first sensor magnet 73 is fixed to the attachment member 72 is not particularly limited, and the first sensor magnet 73 may be adhered to the attachment member 72 by using an adhesive, for example. The attachment member 72 and the first sensor magnet 73 rotate together with the motor shaft 21. The first sensor magnet 73 is positioned on the upper side of the bearing holding part 12d. The first sensor magnet 73 has N poles and S poles that are alternately disposed along the circumferential direction. The upper surface of the first sensor magnet 73 is covered by a magnet cover.

The first rotation sensor 71 is a sensor that detects the rotation of the motor 20. The first rotation sensor 71 is attached to the lower surface of the circuit board 70. The first rotation sensor 71 faces the first sensor magnet 73 and the magnet cover that covers the upper surface of the first sensor magnet 73 with a gap in the axial direction. The first rotation sensor 71 detects the magnetic field generated by the first sensor magnet 73. The first rotation sensor 71 is, for example, a Hall element. Although not shown, a plurality of (for example, three) first rotation sensors 71 are provided along the circumferential direction. By using the first rotation sensor 71 to detect the change of the magnetic field generated by the first sensor magnet 73 that rotates together with the motor shaft 21, the rotation of the motor shaft 21 can be detected. Nevertheless, the first rotation sensor 71 may also be a magnetic resistance element.

The second sensor magnet 74 has a cylindrical shape that is centered on the central axis J1. The second sensor magnet 74 is fixed to the lower surface of the flange part 42. The second sensor magnet 74 is positioned on the outer side of the upper end of the protruding tube 13c, the housing recess 41a, and the bush 54 in the radial direction, and surrounds the upper end of the protruding tube 13c, the housing recess 41a, and the bush 54. The second sensor magnet 74 has N poles and S poles that are alternately disposed along the circumferential direction.

The second rotation sensor (not shown) detects the magnetic field generated by the second sensor magnet 74. The second rotation sensor is, for example, a Hall element. By using the second rotation sensor to detect the change of the magnetic field generated by the second sensor magnet 74 that rotates together with the output part 40, the rotation of the output shaft 41 can be detected. Nevertheless, the second rotation sensor may also be a magnetic resistance element.

The disclosure is not limited to the embodiment described above and may adopt other configurations. The holes provided in the external gear may be bottomed holes that do not penetrate the external gear. The holes are not particularly limited as long as they are provided in the external gear, and the holes may be provided at positions different from the second bearing in the axial direction. Even in such a case, it is still possible to suppress generation of the rotational moment in the direction in which the external gear tilts, as compared with the case where the external gear is provided with protrusions.

The preload member is not particularly limited as long as it can apply a downward preload to the motor shaft. The preload member may be, for example, a coil spring. The preload member may be omitted. The contact part of the second bearing is not particularly limited as long as it is in contact with the external gear from the upper side. The contact part may be a separate member from the outer ring body part. In that case, the contact part may be, for example, a C-ring attached to a groove provided in the outer ring body part. Also, the contact part may be provided in the outer ring body part. In that case, the external gear may have an extension part that extends to the lower side of the outer ring body part, and the contact part may be the lower end of the outer ring body part that is in contact with the extension part. The contact part may be omitted. Each bearing may be a rolling bearing other than a ball bearing. Each bearing may be, for example, a roller bearing or the like.

Application of the electric actuator of the embodiment described above is not particularly limited. The electric actuator of the above-described embodiment may be mounted on a device other than a vehicle. Moreover, the structures illustrated in this specification can be combined as appropriate in the range that does not cause contradiction.

What is claimed is:

1. An electric actuator, comprising:
   a motor comprising a motor shaft that rotates around a central axis;
   a deceleration mechanism connected to a part of the motor shaft on one side in an axial direction;
   an output shaft which extends in the axial direction of the motor shaft on one side of the motor shaft in the axial direction and to which rotation of the motor shaft is transmitted via the deceleration mechanism;
   a first bearing connecting the motor shaft and the output shaft to be relatively rotatable with respect to each other; and
   a second bearing fixed to the motor shaft on the other side in the axial direction with respect to the first bearing,
   wherein the output shaft has a housing recess that is recessed on one side in the axial direction,
   an end of the motor shaft on one side in the axial direction is housed in the housing recess,
   the first bearing supports the motor shaft in the housing recess,
   the motor shaft comprises an eccentric shaft centered on an eccentric axis that is eccentric to the central axis, and
   the deceleration mechanism comprises:
   an external gear connected to the eccentric shaft via the second bearing;
   an internal gear fixed to surround an outer side of the external gear in a radial direction and engaged with the external gear;
   a flange part expanding from the output shaft toward the outer side in the radial direction and positioned on one side of the external gear in the axial direction; and
   a plurality of protrusions protruding from the flange part toward the other side in the axial direction and disposed along a circumferential direction,
   wherein the external gear has a plurality of holes that are recessed on the other side in the axial direction,
   the holes are disposed along the circumferential direction and each have an inner diameter larger than an outer diameter of the protrusion, and
   the protrusions are inserted into the holes respectively and support the external gear to be swingable around the central axis via inner surfaces of the holes.

2. The electric actuator according to claim 1, wherein the holes and the protrusions overlap the second bearing and the eccentric shaft as viewed along the radial direction.

3. The electric actuator according to claim 1, further comprising a preload member that applies a preload toward one side in the axial direction to the motor shaft,
   wherein the second bearing is a rolling bearing which comprises an inner ring and an outer ring positioned on an outer side of the inner ring in the radial direction,
   the motor shaft comprises a large-diameter shaft connected to the other side of the eccentric shaft in the axial direction,
   the large-diameter shaft has a larger outer diameter than the eccentric shaft and is in contact with the inner ring from the other side in the axial direction, and
   the outer ring comprises a contact part that is in contact with the external gear from the other side in the axial direction.

4. The electric actuator according to claim 3, wherein the contact part has an annular shape that extends along the circumferential direction.

5. The electric actuator according to claim 3, wherein the external gear has an annular shape that surrounds the eccentric shaft on the outer side of the eccentric shaft in the radial direction,
   the outer ring comprises an outer ring body part that is fitted to an inner side of the external gear in the radial direction, and
   the contact part protrudes from the outer ring body part toward the outer side in the radial direction and is in contact with an inner circumferential edge of the external gear on a surface of the external gear on the other side in the axial direction.

6. The electric actuator according to claim 3, wherein the contact part presses the external gear and brings the external gear into contact with the flange part.

7. The electric actuator according to claim 6, wherein the external gear comprises:
   an external gear body part; and
   a contact protrusion protruding from the external gear body part toward one side in the axial direction,
   wherein the flange part has a contact recess that is recessed on one side in the axial direction, and
   a surface of the contact protrusion on one side in the axial direction is in contact with a bottom surface of the contact recess.

8. The electric actuator according to claim 3, further comprising a third bearing rotatably supporting a part of the motor shaft on the other side in the axial direction,
   wherein the preload member applies the preload toward one side in the axial direction to the motor shaft via the third bearing,
   the motor shaft comprises a stepped part having an outer diameter that increases from the other side in the axial direction toward one side in the axial direction, and
   the third bearing is in contact with a stepped surface, which faces the other side in the axial direction, of the stepped part from the other side in the axial direction.

* * * * *